(12) United States Patent
Sadakane et al.

(10) Patent No.: US 12,391,027 B2
(45) Date of Patent: Aug. 19, 2025

(54) GLASS

(71) Applicants: AGC Inc., Tokyo (JP); AGC GLASS EUROPE, Louvain-la-Neuve (BE)

(72) Inventors: Shunsuke Sadakane, Tokyo (JP); Kuniko Nagai, Tokyo (JP); Francois Leveque, Guemappe (FR); Meijie Li, Louvain-la-Neuve (BE)

(73) Assignees: AGC Inc., Tokyo (JP); AGC GLASS EUROPE, Louvain-la-Neuve (BE)

( * ) Notice: Subject to any disclaimer, the term of this patent is extended or adjusted under 35 U.S.C. 154(b) by 511 days.

(21) Appl. No.: 17/643,933

(22) Filed: Dec. 13, 2021

(65) Prior Publication Data

US 2022/0105709 A1    Apr. 7, 2022

Related U.S. Application Data

(63) Continuation of application No. PCT/JP2020/024771, filed on Jun. 24, 2020.

(30) Foreign Application Priority Data

Jul. 1, 2019  (JP) .................................. 2019-123212

(51) Int. Cl.
  *B32B 17/10*    (2006.01)
  *B32B 7/12*     (2006.01)
  *B32B 18/00*    (2006.01)

(52) U.S. Cl.
  CPC .......... *B32B 17/10339* (2013.01); *B32B 7/12* (2013.01); *B32B 17/1055* (2013.01); *B32B 18/00* (2013.01); *B32B 2307/4026* (2013.01); *B32B 2307/412* (2013.01); *B32B 2307/546* (2013.01); *B32B 2307/732* (2013.01); *B32B 2457/20* (2013.01)

(58) Field of Classification Search
  CPC ...................................... B32B 17/10
  USPC ........................................ 428/213
  See application file for complete search history.

(56) References Cited

U.S. PATENT DOCUMENTS

2010/0314378 A1    12/2010  Grunert et al.
2019/0009503 A1*   1/2019   Labrot ............. B32B 17/10348
2019/0169068 A1*   6/2019   Oya ........................ B32B 7/12

FOREIGN PATENT DOCUMENTS

| EP | 3489204 A1 * | 5/2019 | ............. B32B 17/10 |
| JP | 2011-510893 A | 4/2011 | |
| JP | 2015-24930 A | 2/2015 | |
| JP | 6065221 B2 | 1/2017 | |
| WO | WO-0116040 A1 * | 3/2001 | ............. C03B 27/04 |

(Continued)

*Primary Examiner* — Tahseen Khan
(74) *Attorney, Agent, or Firm* — Oblon, McClelland, Maier & Neustadt, L.L.P.

(57) ABSTRACT

A glass to be installed in a vehicle includes: a glass member; a colored ceramic layer provided in a predetermined region of the glass member; an opening portion for information acquisition, provided with one or more sides in contact with the colored ceramic layer in plan view; and a plate-shaped member overlapping the opening portion, and extending outside from each of the one or more sides to overlap the colored ceramic layer, wherein the one or more sides include a top side that becomes an upper side upon installing the glass in the vehicle, and wherein the overlapping amount between the colored ceramic layer and the plate-shaped member on the outside of the top side is greater than or equal to 3.5 mm.

21 Claims, 8 Drawing Sheets

(56) References Cited

FOREIGN PATENT DOCUMENTS

| WO | WO 2009/086869 A1 | 7/2009 | | |
|----|-------------------|--------|----|------------|
| WO | WO-2018021499 A1 * | 2/2018 | ............. | B32B 17/10 |
| WO | WO 2020/007939 A1 | 1/2020 | | |

* cited by examiner

GLASS

CROSS-REFERENCE TO RELATED APPLICATIONS

This U.S. non-provisional application is a continuation application of and claims the benefit of priority under 35 U.S.C. § 365(c) from PCT International Application PCT/JP2020/024771 filed on Jun. 24, 2020, which is designated the U.S., and is based upon and claims the benefit of priority of Japanese Patent Application No. 2019-123212 filed on Jul. 1, 2019, the entire contents of which are incorporated herein by reference.

TECHNICAL FIELD

The present disclosure relates to glass.

BACKGROUND ART

In recent years, for the purpose of improving safety of vehicles and the like, vehicles that have functions of automatically avoiding collisions with a vehicle traveling ahead or a pedestrian are being developed. Such a vehicle has an information device, for example, a visible light camera, an infrared sensor, or the like installed in the vehicle, to transmit and receive information on road conditions and the like via a vehicle glass (e.g., the windshield) (see, for example, Published Japanese Translation of PCT International Application No. 2011-510893 (Patent Document 1)).

Information is transmitted and received, for example, through an opening portion provided in a colored ceramic layer formed on the vehicle-interior-side surface of the glass.

However, due to an influence of the colored ceramic layer, in some cases, the optical distortion of the glass in the opening portion becomes worse, and thereby, the information acquisition performance of the information device is reduced.

SUMMARY

According to an embodiment, a glass to be installed in a vehicle includes: a glass member; a colored ceramic layer provided in a predetermined region of the glass member; an opening portion for information acquisition, provided with one or more sides in contact with the colored ceramic layer in plan view; and a plate-shaped member overlapping the opening portion, and extending outside from each of the one or more sides to overlap the colored ceramic layer, wherein the one or more sides include a top side that becomes an upper side upon installing the glass in the vehicle, and wherein the overlapping amount between the colored ceramic layer and the plate-shaped member on the outside of the top side is greater than or equal to 3.5 mm.

EMBODIMENTS OF THE INVENTION

Figure 1:
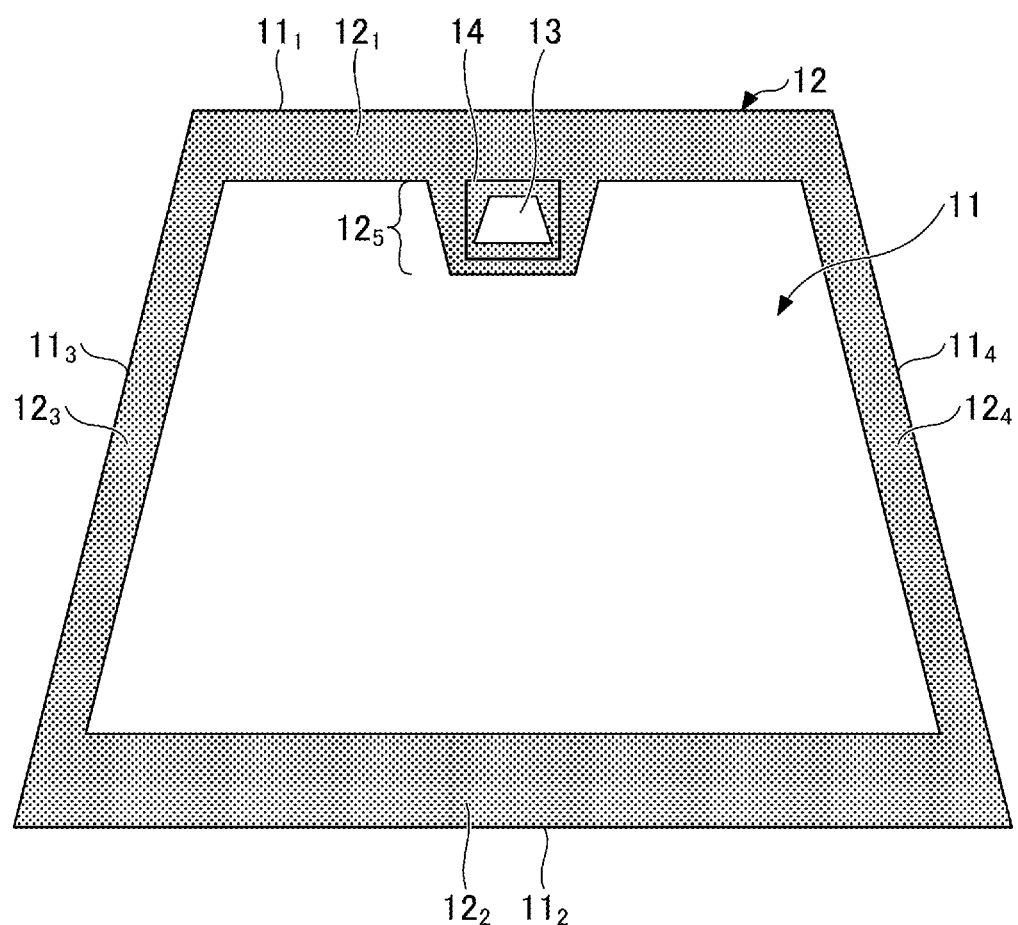
FIG. 1 is a plan view exemplifying a glass according to a first embodiment.

In the following, embodiments for carrying out the present inventive concept will be described with reference to the drawings.

According to one embodiment in the disclosure, a glass can be provided in which the optical distortion is reduced in an opening portion through which an information device transmits and receives information.

Throughout the drawings, the same elements are assigned the same reference numerals, and duplicated description may be omitted. Also, in some of the drawings, the size and shape may be partially exaggerated to facilitate understanding of the contents of the present inventive concept.

Note that in the following, although a windshield for a vehicle is taken as an example for the description, the usage is not limited as such, and the glass according to the present embodiment can also be applied to a window glass other than a windshield, such as a side glass, a rear glass, and the like for a vehicle. Also, the glass according to the present embodiment may be arranged in a region other than a region in which a window glass is arranged conventionally, for example, a pillar or bumper.

Also, in the following description, it is assumed that "plan view" refers to viewing a predetermined area of a glass in a direction normal to the principal surface of the glass, and a "planar shape" refers to a shape of the predetermined area of the glass viewed in the direction normal to the principal surface of the glass.

First Embodiment

Figure 2A:
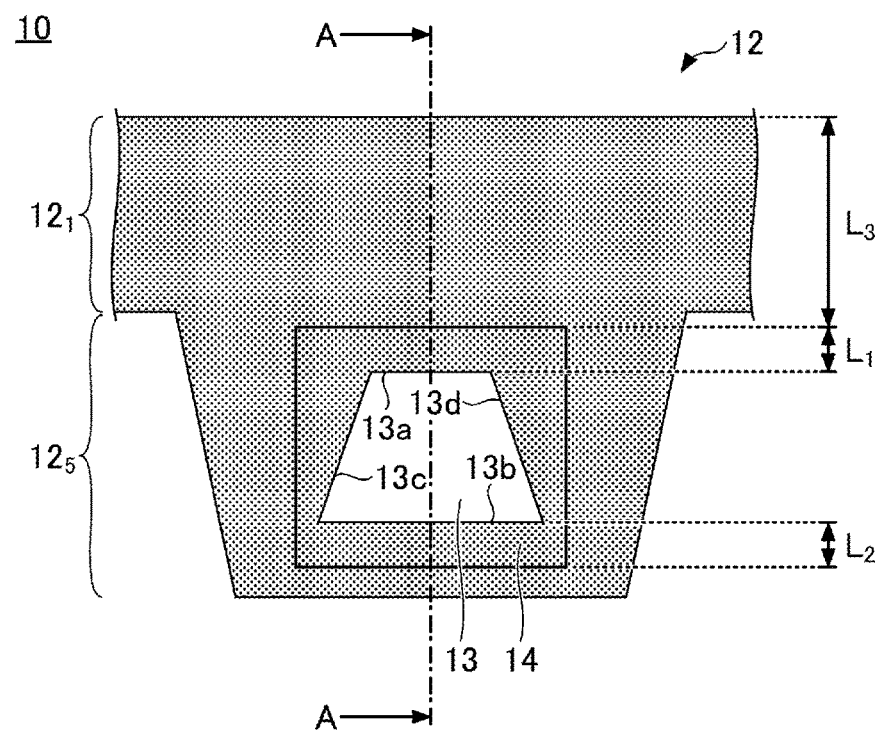
FIGS. 2A-2B are enlarged views illustrating the glass according to the first embodiment.
Figure 2B:
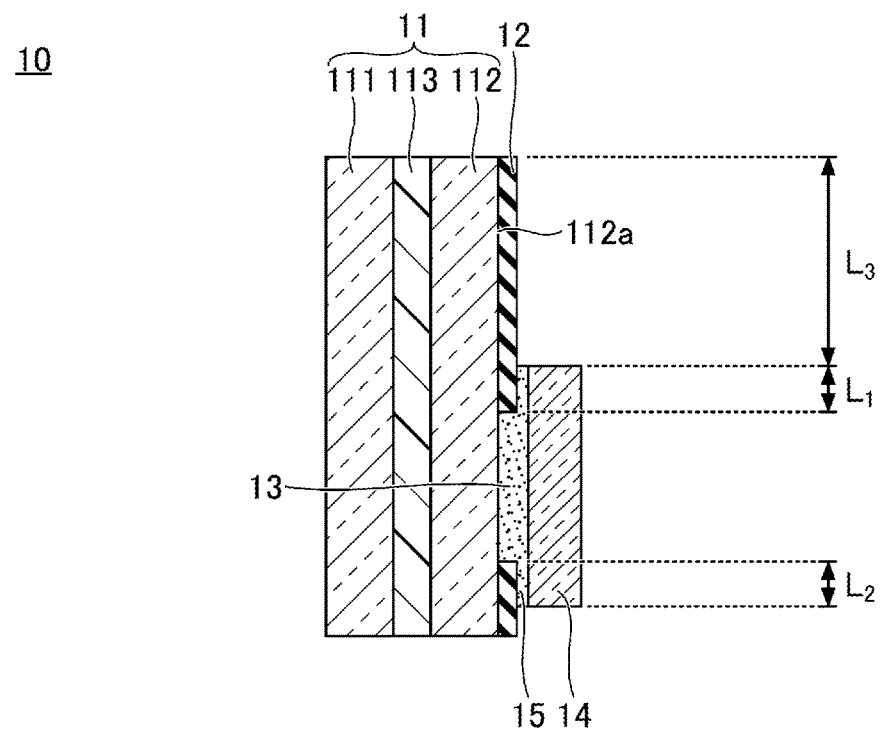

FIG. 1 is a plan view exemplifying a glass according to the first embodiment, and schematically illustrates a state in which a glass plate 112 side is directed toward the front side of the paper. FIGS. 2A-2B are enlarged views exemplifying the glass according to the first embodiment; specifically, FIG. 2A is an enlarged view in the vicinity of an opening portion 13 in FIG. 1, and FIG. 2B is a cross sectional view along a line A-A in FIG. 2A.

In FIGS. 1 and 2A-2B, for the sake of convenience of description, the glass 10 is illustrated with the actual curved shape omitted.

As illustrated in FIGS. 1 and 2A-2B, the glass 10 is a glass installed in a vehicle, and includes a glass member 11, a colored ceramic layer 12, an opening portion 13, a plate-shaped member 14, and an adhesive layer 15. The opening portion 13 is exemplified as a planar isosceles trapezoid.

Note that in the following description, with respect to the glass member 11, a reference numeral $11_1$ denotes the upper edge, a reference numeral 113 denotes the lower edge, a reference numeral $11_3$ denotes the left edge, and a reference numeral $11_4$ denotes the right edge. Here, in the case where the glass 10 is attached to a right-hand drive vehicle, the upper edge corresponds to an edge on the roof side of the vehicle; the lower edge corresponds to an edge on the engine compartment side; the left edge corresponds to an edge on the front passenger's seat side; and the right edge corresponds to an edge on the driver's seat side.

The glass member 11 is a laminated glass having an interlayer 113 between a glass plate 111 as the vehicleexterior-side glass plate, and a glass plate 112 as the vehicle-interior-side glass plate. The glass plate 112 faces the glass plate 111 and is secured to the glass plate 111 via the interlayer 113. The interlayer 113 may be formed of multiple interlayers.

The colored ceramic layer 12 is provided in a predetermined region of the glass member 11. The colored ceramic layer 12 is provided, for example, on the surface 112a on the vehicle-interior side of the glass plate 112. The colored ceramic layer 12 may be provided on the surface 112a on the vehicle-interior side of the glass plate 112, and on a surface on the vehicle-interior side of the glass plate 111. A test region A specified in JIS Standard R3212 (2015) is demarcated in the glass member 11, and the colored ceramic layer 12 is arranged outside of the test region A in plan view. Note that the surface 112a on the vehicle-interior side of the glass plate 112 is the principal surface of the glass 10.

The colored ceramic layer 12 includes, for example, a region $12_1$ formed along the upper edge $11_1$ of the glass member 11; a region $12_2$ formed along the lower edge $11_2$; a region $12_3$ formed along the left edge $11_3$; a region $12_4$ formed along the right edge $11_4$; and a projecting portion $12_5$ projecting from the region $12_1$ toward the center of the glass member 11 in plan view. The planar shape of the projecting portion $12_5$ is, for example, an isosceles trapezoid, rectangle, pie slice, semicircle, or the like.

The colored ceramic layer 12 is an opaque layer, and has a color of black, although not limited to black as long as the visible light transmittance and the ultraviolet transmittance are low. The presence of the opaque colored ceramic layer 12 in the glass member 11 can prevent degradation of members including an adhesive member such as urethane to hold the peripheral portion of the glass member 11 to be attached to the vehicle body, an adhesive member to attach a bracket that locks a device to the glass member 11, and the like, due to ultraviolet light.

The colored ceramic layer 12 can be formed by, for example, applying a ceramic color paste containing meltable glass frit containing a black pigment onto a glass surface by screen printing or the like, and baking it; but is not limited as such.

The thickness of the colored ceramic layer 12 is favorably less than or equal to 20 μm, and more favorably less than or equal to 15 μm.

The opening portion 13 is a region through which an information device that handles visible light, such as a visible light camera or illuminance sensor, or an information device that handles infrared light (e.g., a wavelength of 905 nm or 1,550 nm) such LiDAR (Light Detection and Ranging), acquires information by transmitting and/or receiving the information. In other words, when the glass 10 is installed in a vehicle, the information device can be arranged on the vehicle-interior side of the opening portion 13.

It is favorable that the visible light transmittance of the glass 10 in the opening portion 13 is greater than or equal to 70%. Such a range can improve the information acquisition performance of the information device that handles visible light such as a visible light camera. Also, it is favorable that the glass 10 in the opening portion 13 has an optical transmittance greater than or equal to 90% at a wavelength of 905 nm, or an optical transmittance greater than or equal to 80% at a wavelength of 1,550 nm. Such a range can improve the information acquisition performance of the information device that handles infrared light (e.g., a wavelength of 905 nm or 1,550 nm) such as a LiDAR. Note that the transmittance is a spectral transmittance measured according to a measurement method specified in JIS R3106 (1998).

The opening portion 13 has four sides in contact with the colored ceramic layer 12. Specifically, the opening portion 13 includes a top side 13a that becomes the upper side (the upper edge $11_1$ side) upon installing the glass 10 in a vehicle; a bottom side 13b opposite to the top side 13a interposing the opening portion 13 in-between; a lateral side 13c connected to one end of each of the top side 13a and the bottom side 13b; and a lateral side 13d connected to the other end of each of the top side 13a and the bottom side 13b.

In the example in FIGS. 1 and 2, although the planar shape of the opening portion 13 is an isosceles trapezoid, it is not limited as such, and the planar shape of the opening portion 13 may be a rectangle, pie slice, semicircle, or the like. Also, the opening portion 13 may have a shape that will be described later with reference to FIGS. 4A-4B or the like. Also, each side in contact with the colored ceramic layer 12 is not limited to be a straight line, and may be a curved line or a line in which straight lines and curved lines are mixed.

The area of the opening portion 13 is, for example, greater than or equal to 1,500 mm². By having the area of the opening portion 13 being greater than or equal to 1,500 mm², a region necessary for acquiring information by the information device arranged on the vehicle-interior side of the opening portion 13 can be secured. The area of the opening portion 13 may be greater than or equal to 3,000 mm², greater than or equal to 4,500 mm², greater than or equal to 6,000 mm², or greater than or equal to 9,000 mm².

The plate-shaped member 14 is a member provided for reducing the optical distortion of the glass 10 in the opening portion 13, and is fixed to the glass member 11 and the colored ceramic layer 12 via the adhesive layer 15. Here, the optical distortion is generated not only for visible light but also for infrared light, and in the present inventive concept, refers to optical distortion in visible light or optical distortion in infrared light depending on the information device. The plate-shaped member 14 overlaps the opening portion 13, and extends outside from each of the top side 13a, the bottom side 13b, and the lateral sides 13c and 13d, to overlap the colored ceramic layer 12 in plan view. In other words, the opening portion 13 is surrounded by the colored ceramic layer 12, and the colored ceramic layer 12 overlaps the plate-shaped member 14 on the outside of each side of the opening portion 13.

In the opening portion 13, dispersion in the total thickness of the glass 10 is likely to be generated partially, due to an effect of bending and forming the glass after the colored ceramic layer 12 has been formed on the glass 10 by heating. However, by providing the plate-shaped member 14 in the glass member 11 to overlap the opening portion 13 and to extend outside from each side of the opening portion 13 so as to overlap the colored ceramic layer 12, even in the case where there is dispersion in the total thickness in the opening portion 13 of the glass member 11, the dispersion in the total thickness of the glass 10 in the opening portion 13, namely, the dispersion in the total thickness of the glass members 11, the plate-shaped member 14, and the adhesive layer 15, can be suppressed. In particular, by suppressing the dispersion in the total thickness of the glass 10 in the opening portion 13, the optical distortion of the glass 10 in the opening portion 13 can be reduced. In the following, the dispersion in the total thickness is also referred to as variation in the total thickness.

It is favorable that the variation in the total thickness of the glass 10 in the opening portion 13 is less than or equal to 0.3 mm. As long as the variation in the total thickness of the glass 10 in the opening portion 13 is less than or equal to 0.3 mm, the optical distortion of the glass 10 in the opening portion 13 can be reduced sufficiently.

In this way, by having the plate-shaped member 14 affixed to the glass member 11 to overlap the colored ceramic layer 12 and to extend outside from each side of the opening portion 13 so as to overlap the colored ceramic layer 12, the optical distortion of the glass 10 in the opening portion 13 can be reduced. However, as a result of accumulated investigations, the inventors have found that depending on the positional relationship (overlapping amount) between the colored ceramic layer 12 and the plate-shaped member 14, the optical distortion of the glass 10 in the opening portion 13 may become worse, and thereby, the information acquisition performance of the information device is reduced.

Specifically, the inventors have found that the optical distortion of the glass 10 in the opening portion 13 could be improved by setting an overlapping amount $L_1$ between the colored ceramic layer 12 and the plate-shaped member 14 on the outside of the top side 13a of the opening portion 13, and an overlapping amount $L_2$ between the colored ceramic layer 12 and the plate-shaped member 14 on the outside of the bottom side 13b, to be greater than or equal to 3.5 mm.

Note that the overlapping amount between the colored ceramic layer 12 and the plate-shaped member 14 on the outside of each of the lateral sides 13c and 13d of the opening portion 13 may be greater than 0 mm and less than 3.5 mm, although it is favorably greater than or equal to 3.5 mm.

The glass 10 is installed in a vehicle so that the up-and-down direction is inclined with respect to the normal to the ground in side view. Therefore, the variation in the total thickness in the up-and-down direction of the glass 10 is noticeable, whereas the variation in the total thickness in the left-and-right direction is not noticeable. In other words, suppressing the variation in the total thickness in the up-and-down direction of the glass 10 greatly contributes to reduction of the optical distortion. Therefore, the overlapping amount between the colored ceramic layer 12 and the plate-shaped member 14 on the outside of each of the top side 13a and the bottom side 13b of the opening portion 13 is set to be greater than or equal to 3.5 mm, to suppress the variation in the total thickness in the up-and-down direction of the glass 10.

In contrast, suppressing the variation in the total thickness in the left-and-right direction of the glass 10 exhibits a lesser extent of contribution to reduction of the optical distortion compared to the suppressing in the up-and-down direction. Therefore, the overlapping amount between the colored ceramic layer 12 and the plate-shaped member 14 on the outside of each of the lateral sides 13c and 13d of the opening portion 13 may be greater than 0 mm and less than 3.5 mm.

It is favorable that the plate-shaped member 14 is formed of glass, or synthetic resin having a bend elastic constant of greater than or equal to 50 MPa according to ASTM D790. In particular, in the case where the information device is a LiDAR, it is favorable that the plate-shaped member 14 is formed of soda-lime glass or the like that has a high transmittance in infrared light (e.g., a wavelength of 905 nm or 1,550 nm). One of or both of the surfaces of the plate-shaped member 14 may be provided with a coating for reducing visible light reflection, a coating for reducing infrared reflection, a coating for electric heating, or the like.

Although the planar shape of plate-shaped member 14 is, for example, a rectangle, it is not limited to a rectangle as long as being a shape that overlaps the colored ceramic layer 12 by a required amount on the outside of each side of the opening portion 13 in contact with the colored ceramic layer 12. Note that the plate-shaped member 14 does not need to have an unnecessarily large area as long as the plate-shaped member 14 overlaps the colored ceramic layer 12 on each side of the opening portion 13 in contact with the colored ceramic layer 12 by a required amount.

The thickness of the plate-shaped member 14 is favorably less than or equal to 1 mm, more favorably less than or equal to 0.8 mm, further favorably less than or equal to 0.6 mm, further favorably less than or equal to 0.4 mm, and further favorably less than or equal to 0.2 mm.

The glass member 11 is typically curved depending on design of the vehicle. Therefore, the plate-shaped member 14 is affixed to the curved glass member 11 via the adhesive layer 15. Therefore, if the plate-shaped member 14 is too thick, the plate-shaped member 14 cannot conform to the curvature of the glass member 11, and consequently, the variation of the total thickness of the glass 10 increases. However, as long as the plate-shaped member 14 has a thickness of less than or equal to 1 mm, the plate-shaped member 14 easily conforms the curvature of the glass member 11, and the variation in the total thickness of the glass 10 in the vicinity of the opening portion 13 can be suppressed. As a result, the optical distortion of the glass 10 in the opening portion 13 can be reduced, and thereby, the information acquisition performance of the information device arranged on the vehicle-interior side of the opening portion 13 can be improved.

As the thickness of the plate-shaped member 14 becomes even thinner, the plate-shaped member 14 can conform the curvature of the glass member 11 more easily, and the variation in the total thickness of the glass 10 in the vicinity of the opening portion 13 can be suppressed further. As a result, the optical distortion of the glass 10 in the opening portion 13 can be reduced further, and thereby, the information acquisition performance of the information device arranged on the vehicle-interior side of the opening portion 13 can be improved further.

It is favorable that the curvature of the plate-shaped member 14 is less than that of the glass member 11. By having the curvature of the plate-shaped member 14 less than the curvature of the glass member 11, thanks to cushioning properties of the adhesive layer 15, the plate-shaped member 14 becomes less likely to break. The vertical radius of curvature of the plate-shaped member 14 (a radius of curvature in a direction along the line A-A in FIG. 2A) is favorably greater than or equal to 1,500 mm, more favorably greater than or equal to 2,000 mm, and even more favorably greater than or equal to 2,500 mm. The horizontal radius of curvature of the plate-shaped member 14 (the radius of curvature in a direction perpendicular to the direction along the line A-A in FIG. 2A) is favorably greater than or equal to 2,000 mm, more favorably greater than or equal to 3,000 mm, and even more favorably greater than or equal to 4,000 mm.

The vertical radius of curvature of the plate-shaped member 14 can be calculated from three points: a crossing point of a vertical cross section passing through the center of gravity of the plate-shaped member 14 with the top side edge, a crossing point of the same with the bottom side edge, and the center of gravity. Also, the horizontal radius of curvature of the plate-shaped member 14 can be calculated from three points: a crossing point of a horizontal cross section passing through the center of gravity of the plate-shaped member 14 with the left side edge, a crossing point of the same with the right side edge, and the center of gravity. Note that in a state of the windshield being installed in a vehicle, with respect to the plate-shaped member 14, a side positioned on the upper side is the top side and a side positioned on the lower side is the bottom side.

The area of the plate-shaped member 14 is favorably 1,500 mm$^2$ to 60,000 mm$^2$, more favorably 2,500 mm$^2$ to 50,000 mm$^2$, and even more favorably 4,000 mm$^2$ to 40,000 mm$^2$.

In plan view, it is favorable that a distance $L_3$ between the plate-shaped member 14 and the peripheral edge of the glass member 11 is greater than or equal to 20 mm. This can prevent interference with the adhesive used when attaching the glass 10 to the vehicle.

The thickness of the adhesive layer 15 positioned in the opening portion 13 is favorably greater than or equal to 0.1 mm, more favorably greater than or equal to 0.2 mm, and further favorably greater than or equal to 0.3 mm. As long as the thickness of the adhesive layer 15 positioned in the opening portion 13 is greater than or equal to 0.1 mm, thanks to the cushioning properties of the adhesive layer 15, the variation in the total thickness of the glass 10 can be suppressed in the opening portion 13, and thereby, the optical distortion of the glass 10 in the opening portion 13 can be reduced. As the thickness of the adhesive layer 15 positioned in the opening portion 13 becomes further thicker, the cushioning properties of the adhesive layer 15 is improved further, the variation in the total thickness of the glass 10 can be suppressed further, and thereby, the optical distortion of the glass 10 in the opening portion 13 can be reduced further. Note that it is favorable that the thickness of the adhesive layer 15 positioned in the opening portion 13 is less than or equal to 1 mm. This is because if the adhesive layer 15 is too thick, the transmittance of the glass 10 in the opening portion 13 is reduced.

The material of the adhesive layer 15 is not limited in particular as long as the visible light transmittance of the opening portion 13 can be secured to be greater than or equal to 70%, together with the glass member 11 and the plate-shaped member 14. It is favorable that the adhesive layer 15 contains one or more species of materials selected from among a group constituted with polyvinyl butyral resin, ethylene-vinyl acetate copolymer-based resin, cycloolefin polymer resin, ionomer resin, silicone-based resin, acrylic based resin, and urethane-based resin.

As the adhesive containing silicone-based resin, for example, "Super transparent bond" (Shinto Sangyo Co., Ltd.) and "Beautiful and transparent adhesive MJ199" (manufactured by GSI Creos Corporation) can be exemplified. As the adhesive containing acrylic based resin, for example, "Kireikure" (R)-501 (A-type) (manufactured by AIZ limited company) can be exemplified. As the adhesive containing urethane-based resin, an adhesive for glass "6425N" (manufactured by Scotch Company) and "Pandow 156A" (manufactured by ThreeBond Co., Ltd.).

The bend elastic constant of the plate-shaped member 14 is favorably five times or greater, more favorably 10 times or greater, and even more favorably 100 times or greater than the bend elastic constant of the adhesive layer 15 according to ASTM D790. As long as the bend elastic constant of the plate-shaped member 14 is five times or greater than the bend elastic constant of the adhesive layer 15, it is advantageous in terms of suppressing the variation in the total thickness of the glass 10 in the opening portion 13. As the bend elastic constant of the plate-shaped member 14 becomes 10 times or greater, 100 times or greater, and so on, compared to the bend elastic constant of the adhesive layer 15, the variation in the total thickness of the glass 10 in the opening portion 13 can be suppressed further.

Here, the glass plate 111, the glass plate 112, and the interlayer 113 in the glass member 11 as a laminated glass will be described in detail.

[Glass Plates]

The glass plates 111 and 112 may be inorganic glass or may be organic glass. As the inorganic glass, for example, soda-lime glass, aluminosilicate glass, borosilicate glass, alkali-free glass, quartz glass, and the like can be used without specific restrictions. The glass plate 111 that is positioned on the outside of the glass 10 is favorably inorganic glass from the viewpoint of scratch resistance, or is favorably soda-lime glass from the viewpoint of moldability. In the case where the glass plate 111 and the glass plate 112 are soda-lime glass, clear glass, green glass containing iron components by a predetermined amount or more, and UV-cut green glass can be used suitably.

The inorganic glass may be either of non-tempered glass or tempered glass. Non-tempered glass is obtained by forming molten glass into a plate, and then, annealing the plate. Tempered glass is glass having a compression stress layer formed on the surface of non-tempered glass.

The tempered glass may be either of physically tempered glass such as, for example, thermally tempered glass, or chemically tempered glass. In the case of physically tempered glass, by an operation other than annealing, such as rapidly cooling down a glass plate that has been uniformly heated during bend forming from a temperature around the softening point so as to generate a compression stress on the glass surface by difference in temperature between the glass surface and the glass interior, the glass surface can be tempered.

In the case of chemically tempered glass, for example, after bend forming, by generating a compression stress on the glass surface by an ion exchange method or the like, the glass surface can be tempered. Also, glass that absorbs ultraviolet rays or infrared rays may be used, and the glass is further favorable to be transparent; however, a glass plate that is colored to an extent not impairing the transparency may be used.

On the other hand, as the organic glass, transparent resins such as polycarbonate; acrylic based resin, for example, polymethyl methacrylate and the like; polyvinyl chloride; polystyrene; and the like, may be enumerated.

Note that in the case where the information device is a LiDAR, it is favorable to form the glass plates 111 and 112 of soda-lime glass or the like that has a high transmittance in infrared light (e.g., a wavelength of 905 nm or 1,550 nm).

The shape of the glass plates 111 and 112 is not specifically limited to a rectangular shape, and may be a shape processed to have various shapes and curvatures. For the bend forming of the glass plates 111 and 112, gravity forming, press forming, roller forming, or the like is used. Although the forming method of the glass plates 111 and 112 is also not limited in particular, for example, in the case of inorganic glass, it is favorable that a glass plate is formed by a float process or the like.

It is favorable that the plate thickness of the glass plate 111 is greater than or equal to 1.1 mm and less than or equal to 3.0 mm. If the plate thickness of the glass plate 111 is greater than or equal to 1.1 mm, the strength in terms of the stone-chip resistance or the like is sufficient; and if the thickness is less than or equal to 3 mm, the mass of the glass member 11 is not too large, and it is favorable in terms of the fuel efficiency of the vehicle. The plate thickness of the glass plate 111 is more favorably greater than or equal to 1.8 mm and less than or equal to 2.8 mm, further more favorably greater than or equal to 1.8 mm and less than or equal to 2.6 mm, further more favorably greater than or equal to 1.8 mm and less than or equal to 2.2 mm, and further more favorably greater than or equal to 1.8 mm and less than or equal to 2.0 mm.

It is favorable that the plate thickness of the glass plate 112 is greater than or equal to 0.3 mm and less than or equal to 2.3 mm. The plate thickness of the glass plate 112 being greater than or equal to 0.3 mm makes the handling better, and the plate thickness being less than or equal to 2.3 mm makes the mass not too heavy.

Also, the glass plates 111 and 112 may have a flat shape or may have a curved shape. However, in the case where the glass plates 111 and 112 have curved shapes, and the plate thickness of the glass plate 111 is not appropriate, if two glass plates that have particularly deep bends are molded as the two glass plates 111 and 112, a mismatch would occur between the shapes of the two plates, which greatly affects the glass quality including the residual stress after pressure joining.

However, by setting the plate thickness of the glass plate 112 to be greater than or equal to 0.3 mm and less than or equal to 2.3 mm, the glass quality including the residual stress can be maintained. Setting the plate thickness of the glass plate 112 to be greater than or equal to 0.3 mm and less than or equal to 2.3 mm, is particularly effective in maintaining the glass quality for deeply curved glass. The plate thickness of the glass plate 112 is more favorably greater than or equal to 0.5 mm and less than or equal to 2.1 mm, and further more favorably greater than or equal to 0.7 mm and less than or equal to 1.9 mm. In these ranges, the effects described above are even more notable.

In the case where the glass member 11 is used for, for example, a head-up display, the plate thickness of the glass plates 111 and 112 does not need to be constant, and may vary from place to place as necessary. For example, in the case where the glass member 11 is a windshield, one of or both of the glass plates 111 and 112 may have a wedge shape in cross section, in which the plate thickness becomes greater from the lower end toward the upper end of the windshield in a state of the windshield being attached to the vehicle. In this case, if the film thickness of the interlayer 113 is constant, the sum of the wedge angles of the glass plate 111 and the glass plate 112 may be varied, for example, within a range of greater than 0 mrad and less than or equal to 1.0 mrad.

Films having functions of water-repellency, or of cutting ultraviolet rays or infrared rays, or films having a low-reflectance characteristic or a low-emissivity characteristic may be provided on the outside of either or both of the glass plates 111 and 112. Also, on the side of either or both of the glass plates 111 and 112 contacting the interlayer 113, films for cutting ultraviolet rays or infrared rays, of a low-emissivity characteristic, for absorbing visible light, for coloring, and the like may be provided.

In the case where the glass plates 111 and 112 are inorganic glass having a curved shape, after the glass plates 111 and 112 have been formed by a float process or the like, bend forming is applied before being adhered to the interlayer 113. The bend forming is performed by heating and softening the glass. The heating temperature of the glass during the bend forming is controlled to be within a range of approximately 550° C. to 700° C.

[Interlayer]

As the interlayer 113, a thermoplastic resin is frequently used, and as thermoplastic resins conventionally used for this type of application, for example, plasticized polyvinyl acetal-based resin, plasticized polyvinyl chloride-based resin, saturated polyester-based resin, plasticized saturated polyester-based resin, polyurethane-based resin, plasticized polyurethane-based resin, ethylene-vinyl acetate copolymer-based resin, ethylene-ethyl acrylate copolymer-based resin, cycloolefin polymer resin, ionomer resin, and the like may be enumerated. Also, a resin composition that contains a modified block copolymer hydride described in Japanese Patent No. 6065221 can also be suitably used.

Among these, a plastic polyvinyl acetal-based resin is suitably used because it has a superior balance of properties including transparency, weather resistance, strength, adhesive strength, penetration tolerance, impact energy absorption, moisture resistance, heat insulation, and acoustic insulation. One of these thermoplastic resins may be used alone, or two or more types may be used in combination. Note that "plastic" in the "plastic polyvinyl acetal-based resin" described above means having been plasticized by adding a plasticizer. The same applies to the other plastic resins.

However, in the case where a film or the like is enclosed in the interlayer 113, depending on the type of material to be enclosed, it may be degraded by a specific plasticizer; in such a case, it is favorable that a resin that does not substantially contain the plasticizer is used. In other words, in some cases, it is favorable that the interlayer 113 does not contain a plasticizer. As the resin that does not contain a plasticizer, for example, ethylene-vinyl acetate copolymer-based resin, and the like may be enumerated.

As the polyvinyl acetal-based resin described above, polyvinyl formal resin obtained by having polyvinyl alcohol (hereafter, may also be referred to as "PVA" as necessary) react with formaldehyde; polyvinyl acetal-based resin in a narrow sense obtained by having PVA react with acetaldehyde; and polyvinyl butyral resin (hereafter, may also be referred to as "PVB" as necessary) obtained by having PVA react with n-butylaldehyde; and the like may be enumerated. In particular, PVB is recommended as the suitable one because of its superior balance of properties including transparency, weather resistance, strength, adhesive strength, penetration tolerance, impact energy absorption, moisture resistance, heat insulation, and acoustic insulation. Note that one of these polyvinyl acetal-based resins may be used alone, or two or more types may be used in combination.

However, the material forming the interlayer 113 is not limited to a thermoplastic resin. Also, the interlayer 113 may contain functional particles such as infrared absorbers, ultraviolet absorbers, luminescent agents, and the like. Also, the interlayer 113 may have a colored portion called a shade band.

It is favorable that the film thickness of the interlayer 113 at the thinnest portion is greater than or equal to 0.5 mm. If the film thickness of the interlayer 113 at the thinnest portion is greater than or equal to 0.5 mm, impact resistance required for a laminated glass becomes sufficient. Also, it is favorable that the film thickness of the interlayer 113 at the thickest portion is less than or equal to 3 mm. If the maximum value of the film thickness of the interlayer 113 is less than or equal to 3 mm, the mass of the laminated glass does not become too heavy. The maximum value of the film thickness of the interlayer 113 is more favorably less than or equal to 2.8 mm, and further favorably less than or equal to 2.6 mm.

In the case where the glass member 11 is used for, for example, a head-up display, the film thickness of the interlayer 113 does not need to be constant, and may vary from place to place as necessary. For example, in the case where the glass member 11 is a windshield, the interlayer 113 may have a wedge shape in cross section, in which the film thickness becomes greater from the lower end toward the upper end of the windshield in a state of the windshield being attached to the vehicle. In this case, if the plate thickness of the glass plates 111 and 112 is constant, the wedge angle of the interlayer 113 may be varied within a range of, for example, greater than 0 mrad and less than or equal to 1.0 mrad.

Note that the interlayer 113 may be formed of multiple layers of interlayers. For example, by forming the interlayer 113 to have three interlayers, and making the Shore hardness of the middle layer lower than the Shore hardness of the layers on both outer sides by adjusting a plasticizer or the like, the sound insulation performance of the laminated glass can be improved. In this case, the hardness of the layers on both outer sides may be the same, or may be different from each other.

Also, in the case where the interlayer 113 is formed of multiple layers of interlayers, although it is desirable that all the layers are formed of the same material, some of the layers may be formed of different materials. However, from the viewpoint of adhesion between the glass plates 111 and 112 or functional materials to be contained in the glass member 11, it is desirable to use the materials described above by greater than or equal to 50% of the film thickness of the interlayer 113.

In order to produce an interlayer 113, for example, a resin material to form the interlayer is selected appropriately from among those described above, and in a heated and melted state, extruded to be formed by using an extruder. Extrusion conditions such as the extrusion speed of the extruder are set to be uniform. Thereafter, in order to impart curvatures on the top side and on the bottom side according to design of the laminated glass, for example, the resin film formed by the extrusion may be stretched as needed, to complete the interlayer 113.

[Glass Member (Laminated Glass)]

It is favorable that the total thickness of the glass member 11 is greater than or equal to 2.8 mm and less than or equal to 10 mm. As long as the total thickness of the glass member 11 is greater than or equal to 2.8 mm, sufficient rigidity can be ensured. Also, as long as the total thickness of the glass member 11 is less than or equal to 10 mm, sufficient transmittance can be obtained, and the haze can be reduced.

Along at least one side of the glass member 11, the plate misalignment between the glass plate 111 and the glass plate 112 is favorably less than or equal to 1.5 mm, and more favorably less than or equal to 1 mm. Here, the plate misalignment between the glass plate 111 and the glass plate 112 is, namely, the amount of misalignment between an edge of the glass plate 111 and a corresponding edge of the glass plate 112 in plan view.

Along at least one side of the glass member 11, if the plate misalignment between the glass plate 111 and the glass plate 112 is less than or equal to 1.5 mm, it is favorable in terms of not impairing the external appearance. Along at least one side of the glass member 11, if the plate misalignment between the glass plate 111 and the glass plate 112 is less than or equal to 1.0 mm, it is further favorable in terms of not impairing the external appearance.

In order to manufacture a glass member 11, an interlayer 113 is interposed between a glass plate 111 and a glass plate 112, to form a laminate. Then, for example, the laminate is placed in a rubber bag, to be bonded in a vacuum whose pressure is within a range of −65 to −100 kPa at a temperature within a range of around 70 to 110° C. The heating conditions, the temperature conditions, and the method of lamination are selected as appropriate.

Further, for example, by applying a joining treatment that applies heating and pressing to the laminate under conditions of, for example, 100 to 150° C. and a pressure of 0.6 to 1.3 MPa, a glass member 11 having more excellent durability can be obtained. However, in some cases, this heating and pressing process is not used, in consideration of simplifying the process, and of the characteristics of the materials enclosed into the glass member 11. Note that after the glass member 11 is completed, the plate-shaped member 14 is affixed to a predetermined part of the glass member 11 via the adhesive layer 15.

Between the glass plate 111 and the glass plate 112, to an extent not impairing the effects of the present application, in addition to the interlayer 113, films and/or devices that have functions of heating wire, infrared reflection, light emission, power generation, light control, touch panel, visible light reflection, scattering, decoration, absorption, and the like may be provided. Also, the glass member 11 may have films having functions of anti-fogging, water repellency, heat shielding, reducing reflection, heat generation, and the like, on its surface. Also, films having functions of heat shielding, heat generation, and the like may be provided on the vehicle-exterior-side surface of the glass plate 111 or on the vehicle-interior-side surface of the glass plate 112.

Second Embodiment

In a second embodiment, an example will be described in which, instead of a laminated glass, a single plate of glass is used as a glass member. In the case of using a single plate of glass for a window of a vehicle, it is favorably a tempered glass. Note that in the second embodiment, descriptions of the same elements as in the embodiment already described may be omitted.

Figure 3A:
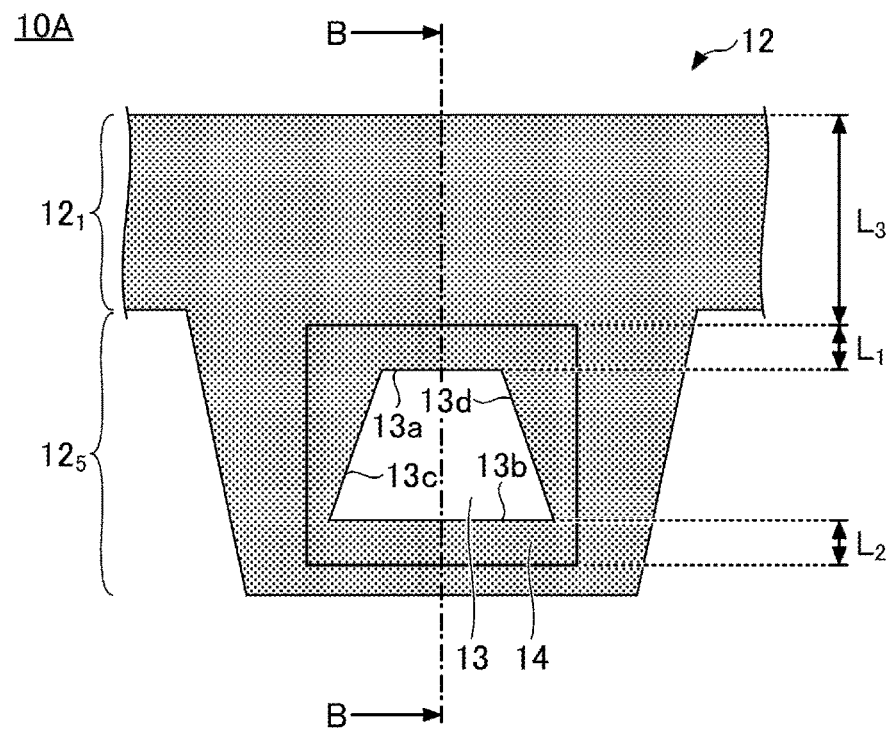
FIG. 3A-3B are enlarged views illustrating a glass according to the second embodiment.
Figure 3B:
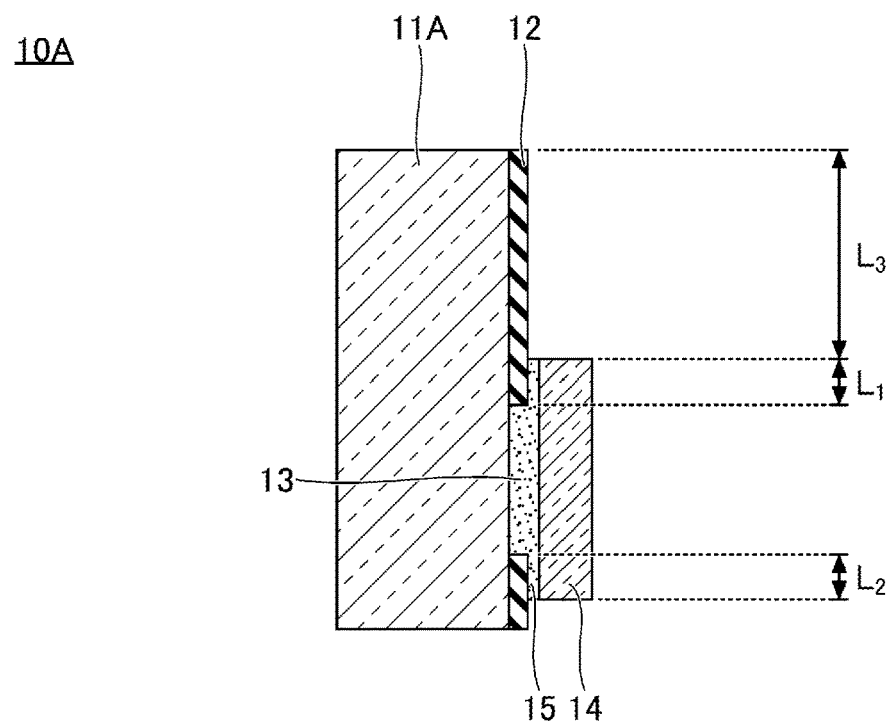

FIGS. 3A-3B are enlarged views exemplifying a glass according to the second embodiment; specifically, FIG. 3A is an enlarged view in the vicinity of an opening portion 13, and FIG. 3B is a cross sectional view along a line B-B in FIG. 3A. Note that since a plan view of the entire glass according to the second embodiment would be substantially the same as in FIG. 1, illustration is omitted.

Referring to FIGS. 3A-3B, a glass 10A is different from the glass 10 (see FIG. 2, etc.), in that the glass member 11 is replaced with a glass member 11A. Although in the glass 10A, the glass member 11A is a tempered glass, in the glass 10, the glass member 11 is a laminated glass. The tempered glass may be either of physically tempered glass such as, for example, thermally tempered glass, or chemically tempered glass. Details of the tempered glass are as described earlier. It is favorable that the plate thickness of the glass member 11A is greater than or equal to 2 mm and less than or equal to 6 mm, from the viewpoints of achieving a sufficient transmittance and reducing the haze, while maintaining the strength such as the stone-chip resistance.

In this way, in the glass for vehicles according to the present embodiment, the glass member may be a laminated glass or may be a tempered glass. Whether the glass member is a laminated glass or tempered glass may be selected as appropriate, depending on which part of the vehicle is provided with the glass for the vehicle according to the present embodiment.

Modified Example of First and Second Embodiments

In a modified example of the first and second embodiments, an example will be described in which the shape of an opening portion in contact with the colored ceramic layer is different from that in the first and second embodiments. Note that in the modified example of the first and second embodiments, descriptions of the same elements as in the embodiments described already may be omitted.

Figure 4A:
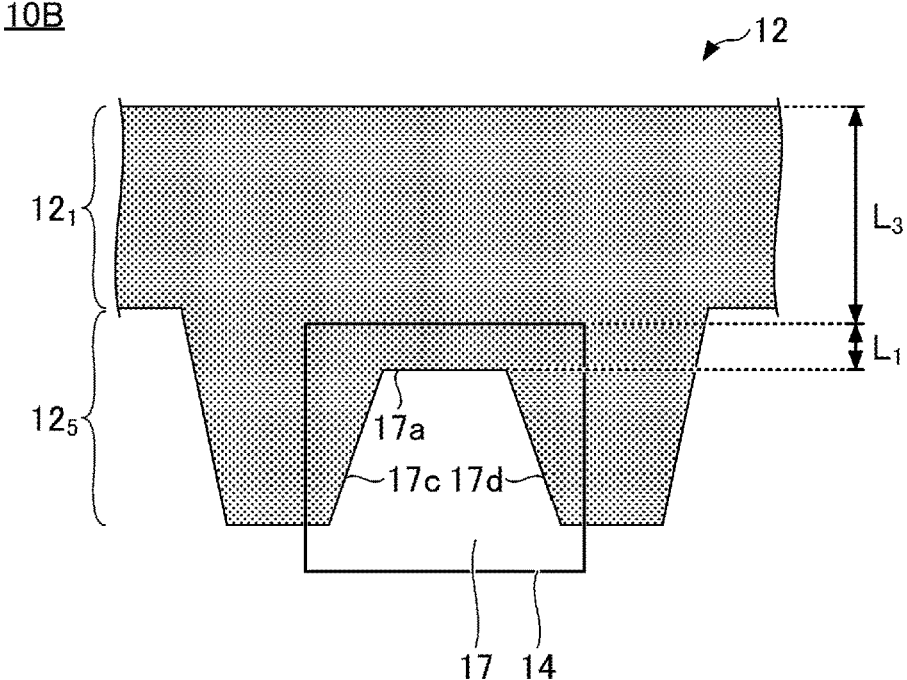
FIG. 4A-4B are partially enlarged views in the vicinity of an opening portion according to a modified example of the first and second embodiments.
Figure 4B:
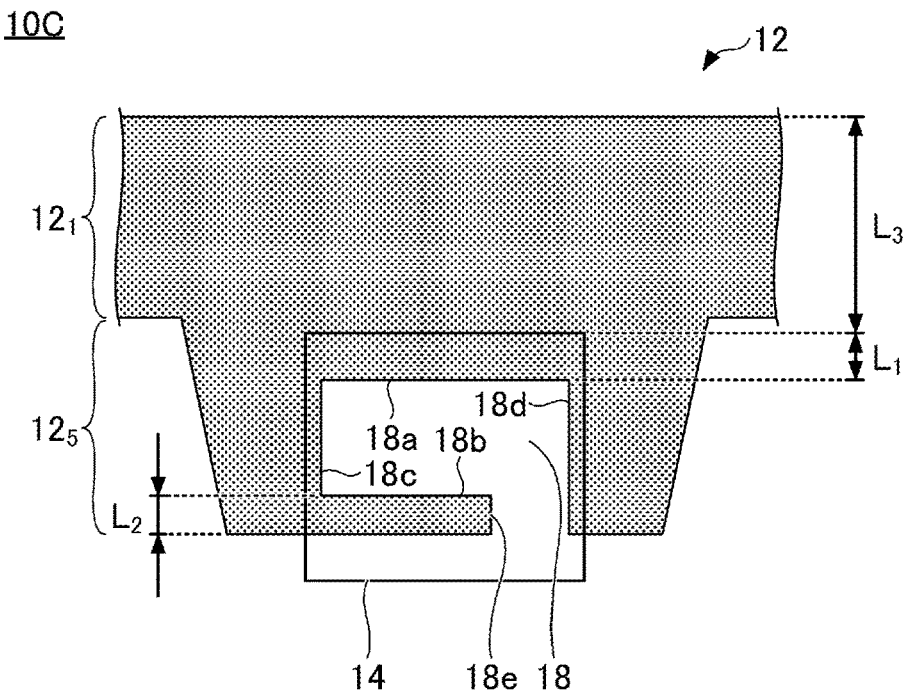

FIGS. 4A-4B are partially enlarged views in the vicinity of an opening portion according to the modified example of the first and second embodiments. Although in the first embodiment, the entire periphery of the opening portion 13 is surrounded by the colored ceramic layer 12 in plan view, in the modified example, it is not limited as such. For example, as exemplified by an opening portion 17 illustrated in FIG. 4A, or an opening portion 18 illustrated in FIG. 4B, a form may be adopted in which a portion of the periphery is surrounded by the colored ceramic layer 12, and the rest of the periphery is not surrounded by the colored ceramic layer 12.

The opening portion 17 illustrated in FIG. 4A has three sides in contact with the colored ceramic layer 12. Specifically, the opening portion 17 includes a top side 17a that becomes the upper side (the upper edge $11_1$ side) when the glass 10B is installed in a vehicle; a lateral side 17c connected to one end of the top side 17a; and a lateral side 17d connected to the other end of the top side 17a. The opening portion 17 does not have a bottom side opposite to the top side 17a interposing the opening portion 17 in-between.

The overlapping amount $L_1$ between the colored ceramic layer 12 and the plate-shaped member 14 on the outside of the top side 17a of the opening portion 17 is greater than or equal to 3.5 mm. Note that the overlapping amount between the colored ceramic layer 12 and the plate-shaped member 14 on the outside of each of the lateral sides 17c and 17d of the opening portion 17 may be greater than 0 mm and less than 3.5 mm, although it is favorably greater than or equal to 3.5 mm. In the glass 10B, in plan view, it is favorable that a distance $L_3$ between the plate-shaped member 14 and the outer peripheral edge of the glass member 11 is greater than or equal to 20 mm. This can prevent interference with the adhesive used when attaching the glass 10B to the vehicle.

The opening portion 18 illustrated in FIG. 4B has five sides in contact with the colored ceramic layer 12. Specifically, the opening portion 18 includes a top side 18a that becomes the upper side (the upper edge $11_1$ side) when the glass 10C is installed in a vehicle; a bottom side 18b opposite to part of the top side 18a interposing the opening portion 18 in-between; a lateral side 18c connected to one end of the top side 18a and one end of the bottom side 18b; a lateral side 18d connected to the other end of the top side 18a; and a lateral side 18e connected to the other end of the bottom side 18b. The opening portion 18 does not have a side connecting the lateral side 18d and the lateral side 18e.

The overlapping amount $L_1$ between the colored ceramic layer 12 and the plate-shaped member 14 on the outside of the top side 18a of the opening portion 18 is greater than or equal to 3.5 mm. It is favorable that the overlapping amount $L_2$ between the colored ceramic layer 12 and the plate-shaped member 14 on the outside of the bottom side 18b of the opening portion 18 is greater than or equal to 3.5 mm. Note that the overlapping amount between the colored ceramic layer 12 and the plate-shaped member 14 on the outside of each of the lateral sides 18c and 18d of the opening portion 18 may be greater than 0 mm and less than 3.5 mm, although it is favorably greater than or equal to 3.5 mm. In the glass 10C, in plan view, it is favorable that a distance $L_3$ between the plate-shaped member 14 and the outer peripheral edge of the glass member 11 is greater than or equal to 20 mm. This can prevent interference with the adhesive used when attaching the glass 10C to the vehicle.

The suitable area of the opening portions 17 and 18 is substantially the same as that of the opening portion 13. Note that in the examples in FIGS. 2 to 4, although one glass member is provided with one opening portion, one glass member may be provided with multiple opening portions. For example, there is a case in which one glass member is provided with one opening portion for a visible camera, another opening portion for LiDAR, and the like that are separate. In this case, the area described above corresponds to the area for each of the opening portions.

In this way, the bottom side of the opening portion may be opened to have a shape like the opening portion 17. Also, A slit-like opening portion may be formed in the colored ceramic layer 12 surrounding the entire periphery of the opening portion to provide a discontinuous region in the colored ceramic layer 12, so as to have a shape like the opening portion 18. Note that as in the opening portions 17 and 18, in the case where a discontinuous region is present in the colored ceramic layer 12 along the periphery of the opening portion, the region of the glass member corresponding to the image angle of a visible light camera or the like is assumed to be the range of the opening portion.

Application Examples

In the following, application examples will be described; note that the present inventive concept is not limited in any way to these examples. Note that FIGS. 5 to 8 will be referred to as appropriate for the description.

Examples 1 to 9

In each of Examples 1 to 9, for a glass using a laminated glass as a glass member, in the case where the colored ceramic layer overlaps the plate-shaped member, the relationship between the overlapping amount and the magnitude of the optical distortion was confirmed along the entire periphery of the opening portion.

Example 1

A glass plate 511 serving as the outer plate (vehicle-exterior-side glass plate) and a glass plate 512 serving as the inner plate (vehicle-interior-side glass plate) when formed as a laminated glass were prepared (commonly known as "VFL", manufactured by AGC Inc.). The dimensions of the glass plates 511 and 512 were set to be 300 mm long×300 mm wide×2 mm thick, and the plates were curved to have a radius of curvature of 3,000 mm in both the vertical direction and the horizontal direction. A colored ceramic layer 52 provided with an opening portion 53 was formed on the vehicle-interior-side surface of the glass plate 512. The planar shape of the opening portion 53 was a square of 40 mm long×40 mm wide.

Next, an interlayer 513 ("PVB" manufactured by Sekisui Chemical Co., Ltd., having a thickness of 0.76 mm) was prepared. Then, a laminate was produced by having the interlayer 513 interposed between the glass plate 511 and the glass plate 512.

Next, as a plate-shaped member 54, a glass plate of 47 mm long×47 mm wide×1 mm thick (commonly known as "FL" manufactured by AGC Inc.) was prepared. Then, the plate-shaped member 54 was adhered to the vehicle-interior side of the glass member 51 via an adhesive layer 55 made of polyvinyl butyral resin and having a size of 47 mm long×47 mm wide×0.1 mm thick, to have an overlapping amount L between the colored ceramic layer 52 and the plate-shaped member 54 being 3.5 mm, along the entire periphery of the opening portion 53.

Next, the laminate having the plate-shaped member 54 adhered was placed in a rubber bag, to be bonded in a vacuum within a range of −65 to −100 kPa, at a temperature range of approximately 70 to 110° C. Then, heating and pressurization were applied to the laminate under conditions of a temperature range of 100 to 150° C. and a pressure range of 0.6 to 1.3 MPa, to produce a glass 50A for evaluation in which the glass member 51 is a laminated glass.

Figure 5:
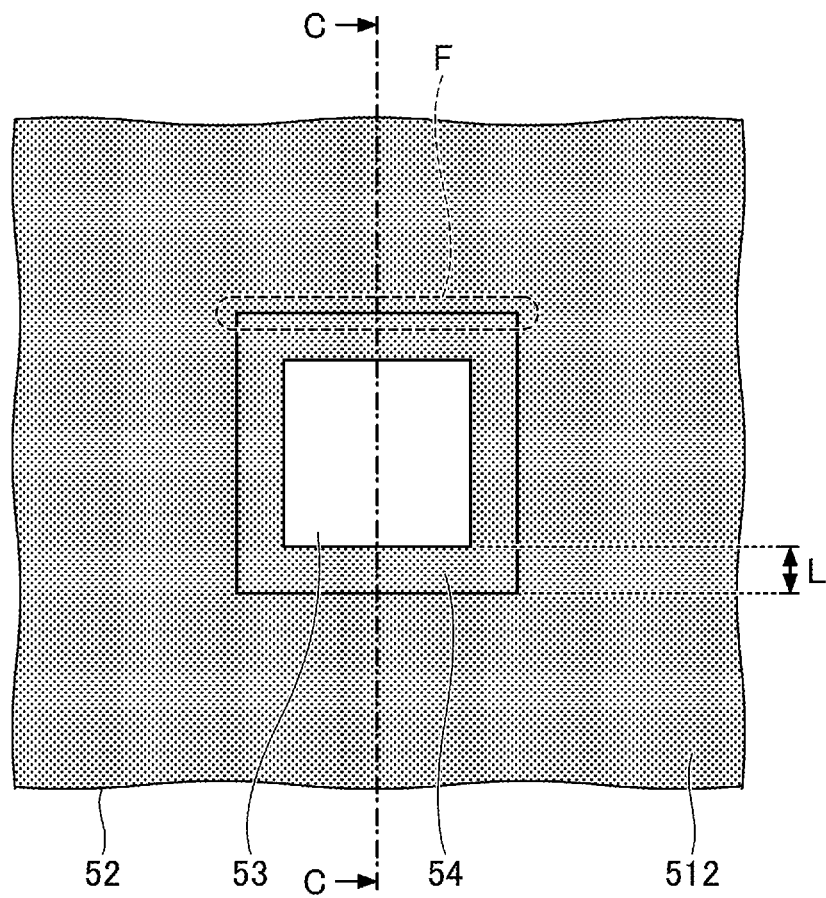
FIG. 5 is a plan view of a glass for evaluation.
Figure 6:
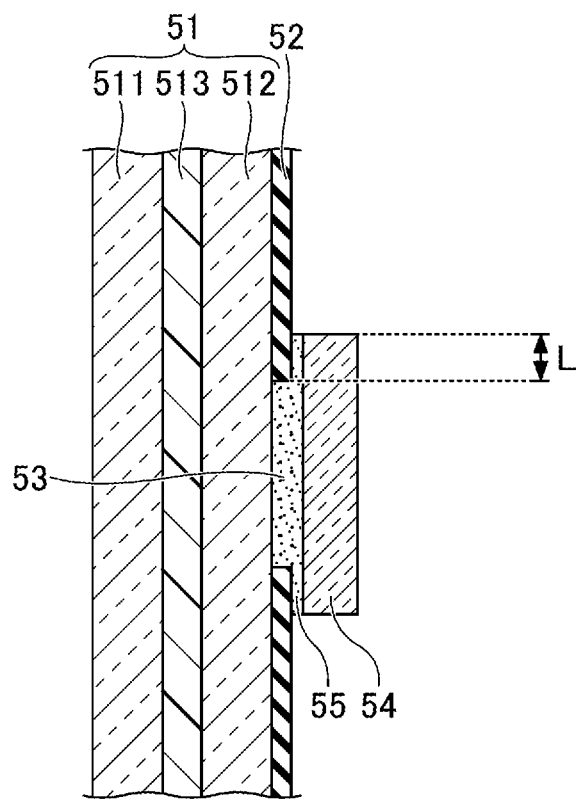
FIG. 6 is a cross sectional view of a glass for evaluation.

The shape of the glass 50A for evaluation is illustrated in FIGS. 5 and 6. However, in FIGS. 5 and 6, for the sake of convenience of description, the glass is illustrated with the actual curved shape omitted. Note that FIG. 5 is a partial plan view of the glass 50A for evaluation, and schematically illustrates a state in which a glass plate 512 side is directed toward the front side of the paper. FIG. 6 is a partial cross sectional view of the glass 50A for evaluation, showing a cross section along a line C-C in FIG. 5.

Example 2

A glass 50B for evaluation was produced in substantially the same way as in Example 1, except that the size of the adhesive layer 55 was set to 47 mm long×47 mm wide×0.2 mm.

Example 3

A glass 50C for evaluation was produced in substantially the same way as in Example 1, except that the size of the plate-shaped member 54 was set to 50 mm long×50 mm wide; the overlapping amount L between the colored ceramic layer 52 and the plate-shaped member 54 was set to 5 mm along the entire periphery of the opening portion 53; and the size of the adhesive layer 55 was set to 50 mm long×50 mm wide×0.2 mm thick.

Example 4

A glass 50D for evaluation was produced in substantially the same way as in Example 1, except that the size of the plate-shaped member 54 was set to 60 mm long×60 mm wide; the overlapping amount L between the colored ceramic layer 52 and the plate-shaped member 54 was set to 10 mm along the entire periphery of the opening portion 53; and the size of the adhesive layer 55 was set to 60 mm long×60 mm wide×0.2 mm thick.

Example 5

A glass 50E for evaluation was produced in substantially the same way as in Example 1, except that the plate-shaped member was not adhered to the vehicle-interior side of the glass member 51.

Example 6

A glass 50F for evaluation was produced in substantially the same way as in Example 1, except that the size of the plate-shaped member 54 was set to 40 mm long×40 mm wide; the overlapping amount L between the colored ceramic layer 52 and the plate-shaped member 54 was set to 0 mm along the entire periphery of the opening portion 53; and the size of the adhesive layer 55 was set to 40 mm long×40 mm wide.

Example 7

A glass 50G for evaluation was produced in substantially the same way as in Example 1, except that the size of the plate-shaped member 54 was set to 46 mm long×46 mm wide; the overlapping amount L between the colored ceramic layer 52 and the plate-shaped member 54 was set to 3 mm along the entire periphery of the opening portion 53; and the size of the adhesive layer 55 was set to 46 mm long×46 mm wide.

Example 8

A glass 50H for evaluation was produced in substantially the same way as in Example 1, except that the size of the plate-shaped member 54 was set to 40 mm long×40 mm wide; the overlapping amount L between the colored ceramic layer 52 and the plate-shaped member 54 was set to 0 mm along the entire periphery of the opening portion 53; and the size of the adhesive layer 55 was set to 40 mm long×40 mm wide×0.2 mm thick.

Example 9

A glass 50I for evaluation was produced in substantially the same way as in Example 1, except that the size of the plate-shaped member 54 was set to 46 mm long×46 mm wide; the overlapping amount L between the colored ceramic layer 52 and the plate-shaped member 54 was set to 3 mm along the entire periphery of the opening portion 53; and the size of the adhesive layer 55 was set to 46 mm long×46 mm wide×0.2 mm thick.

(Evaluation 1)

For each of the glasses 50A to 50I for evaluation, the magnitude of the optical distortion was visually checked. Details are as follows.

Figure 7:
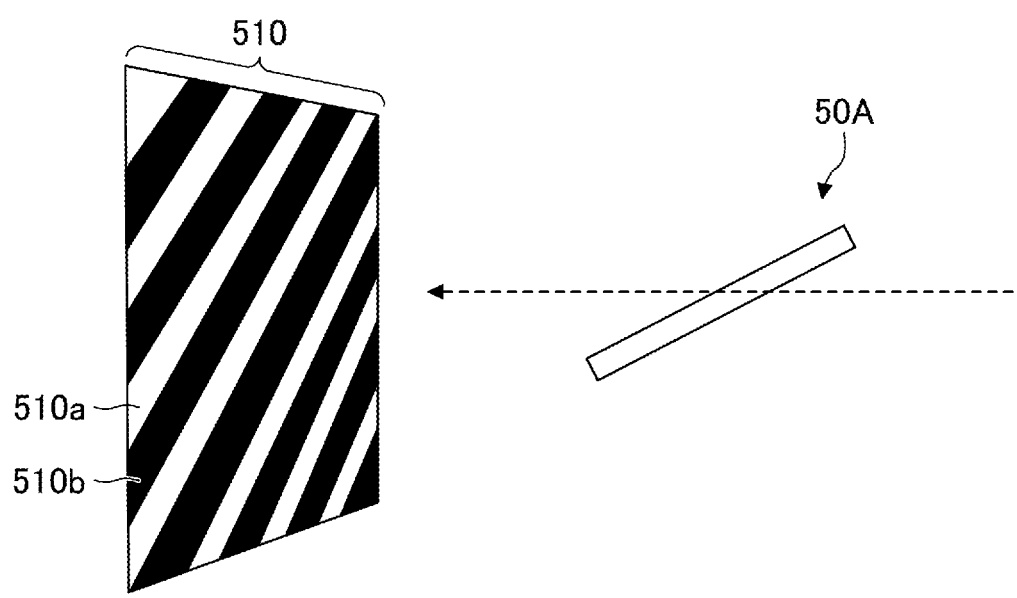
FIG. 7 is a diagram (part 1) illustrating evaluation of optical distortion.

As illustrated in FIG. 7, the glass 50A for evaluation was arranged to be tilted by an angle that is the same angle realized when attaching the glass to a vehicle, and a zebra pattern 510 was arranged on the vehicle-exterior side. The zebra pattern 510 was a pattern of multiple black lines 510*b* provided on a white background 510*a*. The black lines 510*b* were provided to have an angle of 45 degrees with respect to the bottom side of the zebra pattern 510, and to be parallel to one another.

The optical distortion was evaluated according to the degree of distortion generated in the zebra pattern 510 in the vicinity of the boundary between the opening portion 53 and the colored ceramic layer 52, as viewing the zebra pattern 510 from the vehicle-interior side of the glass 50A for evaluation.

Figure 8A:
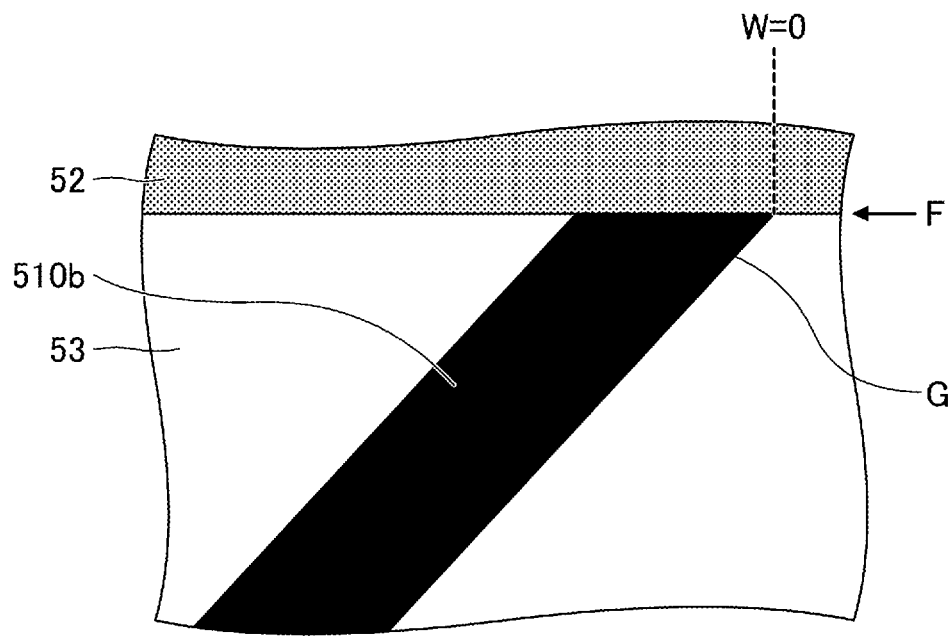
FIG. 8A-8B are diagrams (part 2) illustrating evaluation of optical distortion.
Figure 8B:
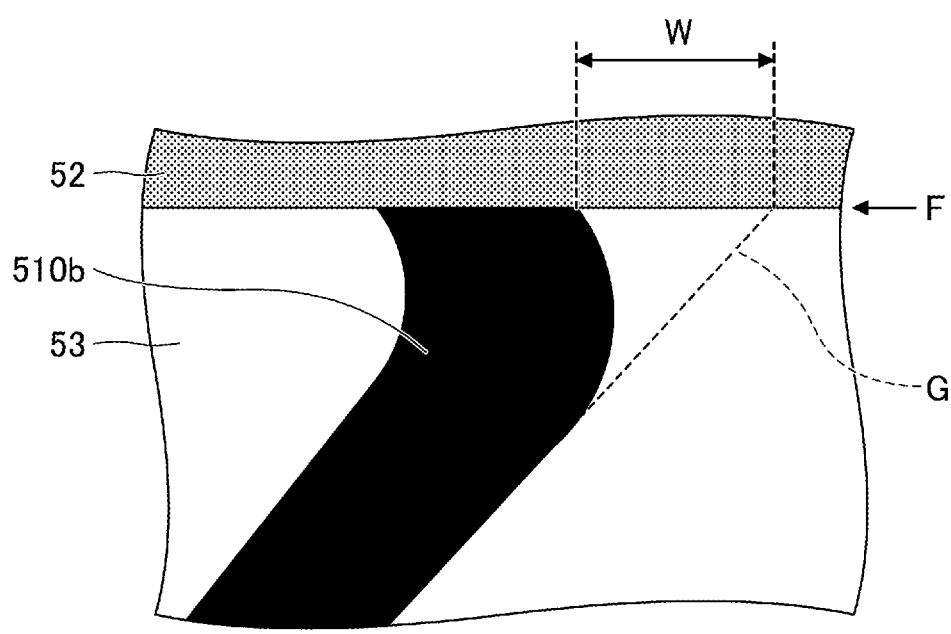

FIGS. 8A and 8B are examples of enlarged views of the zebra pattern 510 in the vicinity of a boundary F between the opening portion 53 and the colored ceramic layer 52 enclosed by an elongated circle on the glass 50A for evaluation in FIG. 5, as viewed from the vehicle-interior side of the glass 50A for evaluation.

FIG. 8A is an example in which no optical distortion is generated, whereas FIG. 8B is an example in which optical distortion is generated. In FIG. 8B, the black line 510*b* of the zebra pattern 510 looks distorted as if curved in the vicinity of the boundary F between the opening portion 53 and the colored ceramic layer 52. Therefore, a distance between a position at which an extended line G of the right side of the black line 510*b* crosses the boundary F, and a position at which the black line 510*b* actually crosses the boundary F, is adopted as a measure of distortion (W), to evaluate the optical distortion of the glass 50A for evaluation according to the following criteria. Table 1 shows results of evaluations where a case of W<3 mm was evaluated as Excellent; a case of 3 mm≤W<5 mm was evaluated as Good; and a case of W≥5 mm was evaluated as Failing.

TABLE 1

|  | Overlapping amount (entire perimeter) | Thickness of plate-shaped member | Thickness of adhesive layer | Result (optical distortion) |
|---|---|---|---|---|
| Ex. 1 | 3.5 mm | 1 mm | 0.1 mm | Good |
| Ex. 2 | 3.5 mm | 1 mm | 0.2 mm | Excellent |
| Ex. 3 | 5 mm | 1 mm | 0.2 mm | Excellent |
| Ex. 4 | 10 mm | 1 mm | 0.2 mm | Excellent |
| Ex. 5 | — | — | — | Failing |
| Ex. 6 | 0 mm | 1 mm | 0.1 mm | Failing |
| Ex. 7 | 3 mm | 1 mm | 0.1 mm | Failing |
| Ex. 8 | 0 mm | 1 mm | 0.2 mm | Failing |
| Ex. 9 | 3 mm | 1 mm | 0.2 mm | Failing |

As shown in Table 1, in the cases where the overlapping amount L between the colored ceramic layer 52 and the plate-shaped member 54 was set to be greater than or equal to 3.5 mm along the entire periphery of the opening portion 53, it was confirmed that the optical distortion was not a problem. In particular, as can be seen by comparing Example 1 with Example 2, even when the overlapping amount L was the same, the optical distortion was reduced more when the adhesive layer 55 was thicker. This is because the thickness of the adhesive layer 55 positioned in the opening portion 53 was thicker, the cushioning properties of the adhesive layer 55 were further improved, and thereby, the variation in the total thickness of the glass for evaluation could be suppressed further.

Examples 10 and 11

In Examples 10 and 11, for a glass using a laminated glass as a glass member, in the case where the colored ceramic layer overlaps the plate-shaped member either along the top and bottom sides, or along the left and right sides of the opening portion, the relationship between the overlapping amount and the magnitude of the optical distortion was confirmed.

Example 10

A glass 50J for evaluation was produced in substantially the same way as in Example 1, except that the size of the plate-shaped member 54 was set to 40 mm long×47 mm wide; the size of the adhesive layer 55 was set to 40 mm long×47 mm wide; the overlapping amount L between the colored ceramic layer 52 and the plate-shaped member 54 was set to 0 mm along the top and bottom sides of the opening portion 53; and the overlapping amount L between the colored ceramic layer 52 and the plate-shaped member 54 was set to 3.5 mm along the left and right sides of the opening portion 53.

Example 11

A glass 50K for evaluation was produced in substantially the same way as in Example 1, except that the size of the plate-shaped member 54 was set to 47 mm long×40 mm wide; the size of the adhesive layer 55 was set to 47 mm long×40 mm wide; the overlapping amount L between the colored ceramic layer 52 and the plate-shaped member 54 was set to 3.5 mm along the top and bottom sides of the opening portion 53; and the overlapping amount L between the colored ceramic layer 52 and the plate-shaped member 54 was set to 0 mm along the left and right sides of the opening portion 53.

(Evaluation 2)

For each of the glasses 50J and 50K for evaluation, the magnitude of the optical distortion was visually checked. The evaluation criteria were the same as in Evaluation 1. The results are shown in Table 2.

TABLE 2

|  | Overlapping amount (top and bottom or left and right) | Thickness of plate-shaped member | Thickness of adhesive layer | Result (optical distortion) |
|---|---|---|---|---|
| Ex. 10 | Top and bottom: 0 m Left and right: 3.5 mm | 1 mm | 0.1 mm | Failing |
| Ex. 11 | Top and bottom: 3.5 mm Left and right: 0 mm | 1 mm | 0.1 mm | Good |

As shown in Table 2, in the case where the overlapping amount L between the colored ceramic layer 52 and the plate-shaped member 54 was set to 3.5 mm along the top and bottom sides of the opening portion 53, even if the overlapping amount L between the colored ceramic layer 52 and the plate-shaped member 54 was set to 0 mm along the left and right sides of the opening portion 53, it was confirmed that the optical distortion was not a problem.

In contrast, in the case where the overlapping amount L between the colored ceramic layer 52 and the plate-shaped member 54 was set to 0 mm along the top and bottom sides of the opening portion 53, even when the overlapping amount L between the colored ceramic layer 52 and the plate-shaped member 54 was set to 3.5 mm on the left and right sides of the opening portion 53, it was confirmed that the optical distortion exceeds the allowable range.

This is because, as described above, suppressing the variation in the total thickness in the up-and-down direction of the glass for evaluation greatly contributes to reduction of the optical distortion, whereas suppressing the variation in the total thickness in the left-and-right direction of the glass exhibits a lesser extent of contribution to reduction of the optical distortion. In other words, in order to suppress the variation in the total thickness in the up-and-down direction of the glass for evaluation, it is effective to make the overlapping amount L between the colored ceramic layer 52 and the plate-shaped member 54 greater than or equal to 3.5 mm along the top and bottom sides of the opening portion 53. It is obvious that the same is true for an actual glass that is different in shape from the glass for evaluation.

As above, the favorable embodiments and the like have been described in detail; note that the present inventive concept is not limited to the embodiments and the like described above, and without deviating from the scope described in the claims, the embodiments and the like described above can be changed and replaced in various ways.

The invention claimed is:

1. A glass that is to be installed in a vehicle, comprising:
a glass member;
a colored ceramic layer provided in a predetermined region of the glass member;
an opening portion for information acquisition, provided with one or more sides in contact with the colored ceramic layer in plan view; and
a plate-shaped member overlapping the opening portion, and extending outside from each of the one or more sides to overlap the colored ceramic layer,
wherein
the plate-shaped member is formed of glass,
the one or more sides include a top side that becomes an upper side upon installing the glass in the vehicle, and
the overlapping amount between the colored ceramic layer and the plate-shaped member on the outside of the top side is greater than or equal to 3.5 mm.

2. The glass as claimed in claim 1, wherein the one or more sides include a bottom side opposite to the top side interposing the opening portion in-between upon installing the glass in the vehicle, and wherein an overlapping amount between the colored ceramic layer and the plate-shaped member on the outside of the bottom side is greater than or equal to 3.5 mm.

3. The glass as claimed in claim 2, wherein the one or more sides include a lateral side connected to at least one of the top side or the bottom side upon installing the glass in the vehicle, and wherein an overlapping amount between the colored ceramic layer and the plate-shaped member on the outside of the lateral side is greater than or equal to 3.5 mm.

4. The glass as claimed in claim 1, wherein the plate-shaped member is fixed to the glass member and the colored ceramic layer via an adhesive layer, and
wherein a thickness of the adhesive layer positioned in the opening portion is greater than or equal to 0.1 mm.

5. The glass as claimed in claim 4, wherein the adhesive layer contains one or more species of materials selected from the group consisting of a polyvinyl butyral resin, an ethylene-vinyl acetate copolymer-based resin, a cycloolefin polymer resin, an ionomer resin, a silicone-based resin, an acrylic based resin, and a urethane-based resin.

6. The glass as claimed in claim 4, wherein a bend elastic constant of the plate-shaped member according to ASTM D790 is five times or greater than a bend elastic constant of the adhesive layer.

7. The glass as claimed in claim 1, wherein variation in a total thickness of the glass in the opening portion is less than or equal to 0.3 mm.

8. The glass as claimed in claim 1, wherein the plate-shaped member has a thickness of less than or equal to 1 mm.

9. The glass as claimed in claim 1, wherein the plate-shaped member is provided with a coating for reducing visible light reflection, a coating for reducing infrared reflection, or a coating for electric heating.

10. The glass as claimed in claim 1, wherein a bend elastic constant of the plate-shaped member is greater than or equal to 50 MPa according to ASTM D790.

11. The glass as claimed in claim 1, wherein the colored ceramic layer has a thickness of less than or equal to 20 μm.

12. The glass as claimed in claim 1, wherein the glass in the opening portion has a visible light transmittance of greater than or equal to 70%.

13. The glass as claimed in claim 1, wherein the glass in the opening portion has an optical transmittance greater than or equal to 90% at a wavelength of 905 nm, or an optical transmittance greater than or equal to 80% at a wavelength of 1,550 nm.

14. The glass as claimed in claim 1, wherein the glass member is a tempered glass.

15. The glass as claimed in claim 1, wherein the glass member is a laminated glass having an interlayer between a vehicle-exterior-side glass plate, and a vehicle-interior-side glass plate.

16. The glass as claimed in claim 1, wherein in plan view, a distance between the plate-shaped member and an outer peripheral edge of the glass member is greater than or equal to 20 mm.

17. The glass as claimed in claim 1, wherein an area of the plate-shaped member is 1,500 mm² to 60,000 mm².

18. The glass as claimed in claim 4, wherein the thickness of the adhesive layer positioned in the opening portion is less than or equal to 1 mm.

19. The glass as claimed in claim 1, wherein the overlapping amount between the colored ceramic layer and the plate-shaped member is less than or equal to 10 mm.

20. The glass as claimed in claim 1, wherein in plan view, a distance between the plate-shaped member and an outer peripheral edge of the glass member is greater than or equal to 20 mm.

21. The glass as claimed in claim 14, wherein a plate thickness of the glass member is greater than or equal to 2 mm and less than or equal to 6 mm.

* * * * *